United States Patent
Lin

(10) Patent No.: US 6,766,610 B1
(45) Date of Patent: Jul. 27, 2004

(54) STRUCTURE FISHING LURE CASE

(76) Inventor: Po-Hui Lin, No. 9, Lane 96, Sec. 2, Ho-Ping East Road, Taipei (TW)

(*) Notice: Subject to any disclaimer, the term of this patent is extended or adjusted under 35 U.S.C. 154(b) by 0 days.

(21) Appl. No.: 10/455,338

(22) Filed: Jun. 6, 2003

(51) Int. Cl.[7] .............................................. A01K 97/06
(52) U.S. Cl. .................... 43/54.1; 43/57.1; 206/315.11
(58) Field of Search ................................ 43/54.1, 57.1, 43/57.2; 206/315.11, 523; 220/528

(56) References Cited

U.S. PATENT DOCUMENTS

| | | | | |
|---|---|---|---|---|
| 2,364,807 A | * | 12/1944 | Nelson, Jr. .................... | 43/57.1 |
| 2,610,430 A | * | 9/1952 | Neiman ........................ | 43/57.1 |
| 2,846,806 A | * | 8/1958 | Gaines ......................... | 43/57.1 |
| 3,639,021 A | * | 2/1972 | Fee ........................... | 312/234.1 |
| 3,648,400 A | * | 3/1972 | Wolfe .......................... | 43/54.1 |
| 5,392,557 A | * | 2/1995 | Harmon et al. ............... | 43/57.1 |
| 5,505,328 A | * | 4/1996 | Stribiak ....................... | 220/4.22 |
| 5,606,820 A | * | 3/1997 | Suddeth ....................... | 43/57.1 |

FOREIGN PATENT DOCUMENTS

GB            1454990         * 11/1976

* cited by examiner

Primary Examiner—Robert P. Swiatek
Assistant Examiner—David J Parsley
(74) Attorney, Agent, or Firm—Rosenberg, Klein & Lee

(57) ABSTRACT

An improved structure fishing lure case comprised of an enclosure, anchoring spacers, and a top lid. The features are that the enclosure is of one-piece plastic injection-molded construction, the enclosure providing for the organized placement of fishing lures to further facilitate their storage and retrieval.

1 Claim, 5 Drawing Sheets

STRUCTURE FISHING LURE CASE

BACKGROUND OF THE INVENTION

1) Field of the Invention

The invention herein relates to fishing equipment and accessories, specifically an improved structure fishing lure case comprised of an enclosure, anchoring spacers, and a top lid, the features of which include an enclosure of one-piece plastic injection-molded construction, the enclosure providing for the organized placement of fishing lures to further facilitate their storage and retrieval.

2) Description of the Prior Art

Conventional fishing tackle boxes utilized for the storage of line, hooks, floats, lead sinkers, lures, and other angling accessories are typically comprised of a container and a cover, the said container partitioned into compartments that are rectangular, square, or lengthy channels, and so on. The holding of all the said angling accessories by the conventional product can be problematic, especially for fishing lures. Currently marketed fishing lures are generally crafted in the shape of minnows with a hook attached at the abdomen or tail, but lures are also available in a range of shapes large and small such that if a quantity were placed in a confined space, users may suffer a puncture wound to the fingers while groping for a lure or damage clothing due to snagging by a hook. Furthermore, the situating of a plurality of lures in such a limited area at the same time also results in the wear and breakage of the hooks at the abdominal and posterior aspects of the lures. As such, the applicant of the invention attempted improvement to the prior art Referring to FIG. 1 an FIG. 2 in U.S. Pat. No. 6,427,834 (Improved Structure of an Artificial Fish Bait Organizer), the said improved structure of an artificial bait organizer is comprised of an accommodating box 2, a supporting frame 3, sand a positioning cushion 4, wherein:

The accommodating box 2 is a flat rectangular box of one-piece plastic injection-molded construction, with the said accommodating box 2 consisting of a rectangular accommodating frame 21 constituting the lower section and a corresponding rectangular upper lid 22 constituting the upper section.

The supporting frame 3 is a rectangular structural member of one-piece plastic injection-molded construction, the said supporting frame 3 having a plurality of accommodation grooves 31 distributed within and, furthermore, a positioning groove 32 formed in the upper edge at the two extremities of each accommodation groove 31.

Each positioning cushion 4 is designed as an elongate bar having wave-shaped contours across the top extent; a latching groove 41 is formed along the center of the trough between every two wave-shaped peaks and, furthermore, each said latching groove 41 is aligned with a positioning groove 32 formed in the upper aspect at the two extremities of each accommodation groove 31; and each said positioning cushion 4 is fixed to the two ends of the supporting frame 3, accommodation groove 31.

The supporting frame 3 is placed into the accommodating frame 21 of the accommodating box 2 to enable assembly into a completed improved structure of an artificial fish bait organizer. The said improvement to the art consists of designing the accommodating box 2 and the supporting frame 3 as two discrete components. From a manufacturing perspective, this further complicates the finishing process and increases production cost. In terms of assembly, more time and labor are expended. Additionally, since there are more structural components, the total assembled weight is overly heavy and quite a load to users. However, to overcome the existent drawbacks of the conventional product such that it is more practical and convenient to utilize, the applicant of the invention herein addressed the drawbacks of the conventional product based on many years of professional production experience, conducting extensive research and development to optimize the invention herein for even greater practicality which, following repeated testing and refinement, culminated in the successful development of the improved structure fishing lure case of the invention herein.

SUMMARY OF THE INVENTION

The objective of the invention herein is to provide an improved structure fishing lure case in which the enclosure is of one-piece plastic injection-molded construction, with the enclosure enabling the organized placement of fishing lures as well as further facilitating their storage and retrieval.

To enable the examination committee a further understanding of the advantages and unique features of the structure of the present invention, the brief description of the drawings below are followed by the detailed description of the invention herein.

DETAILED DESCRIPTION OF THE INVENTION

Figure 1:
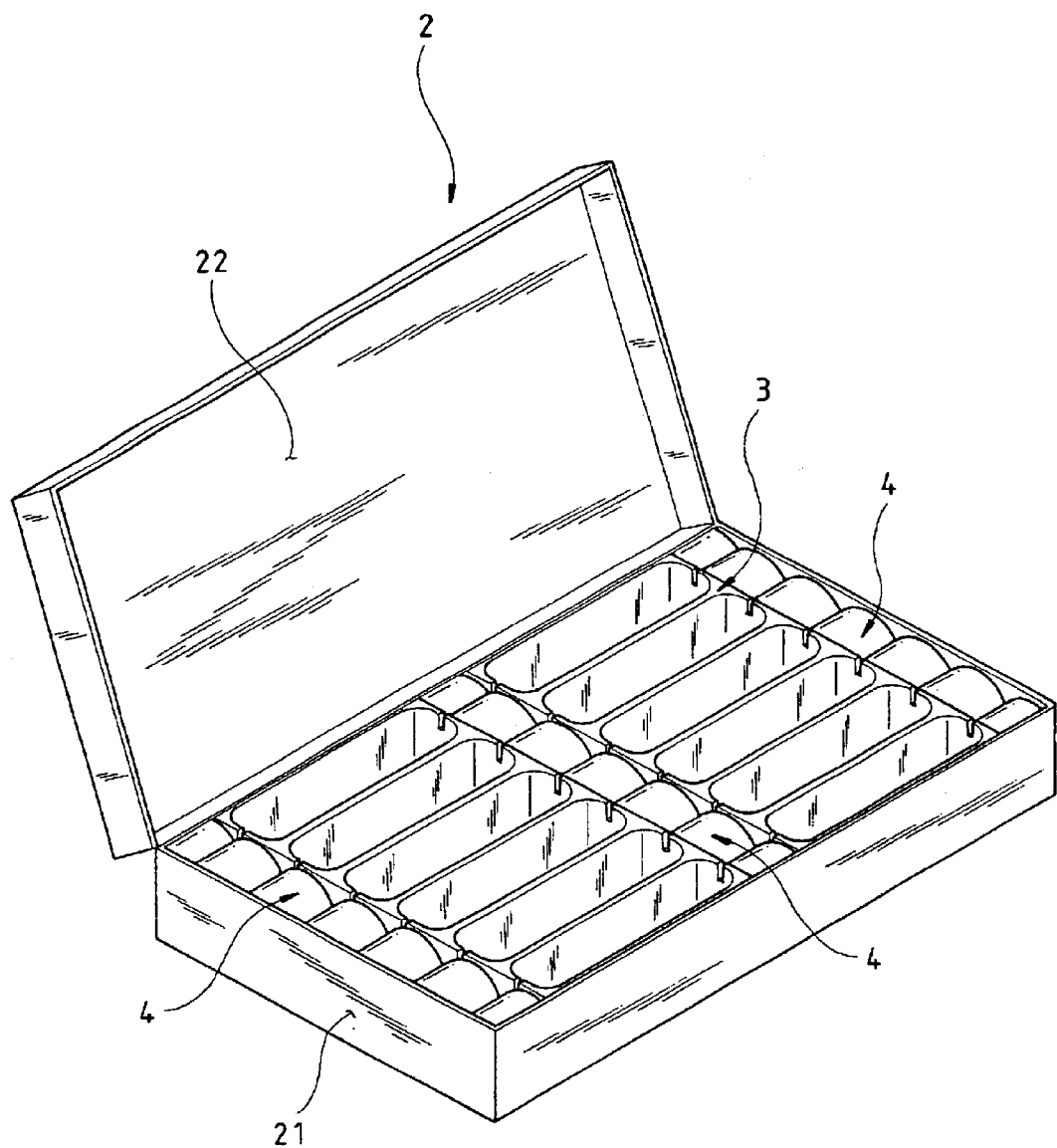
FIG. 1 is an isometric drawing of a conventional product.
Figure 2:
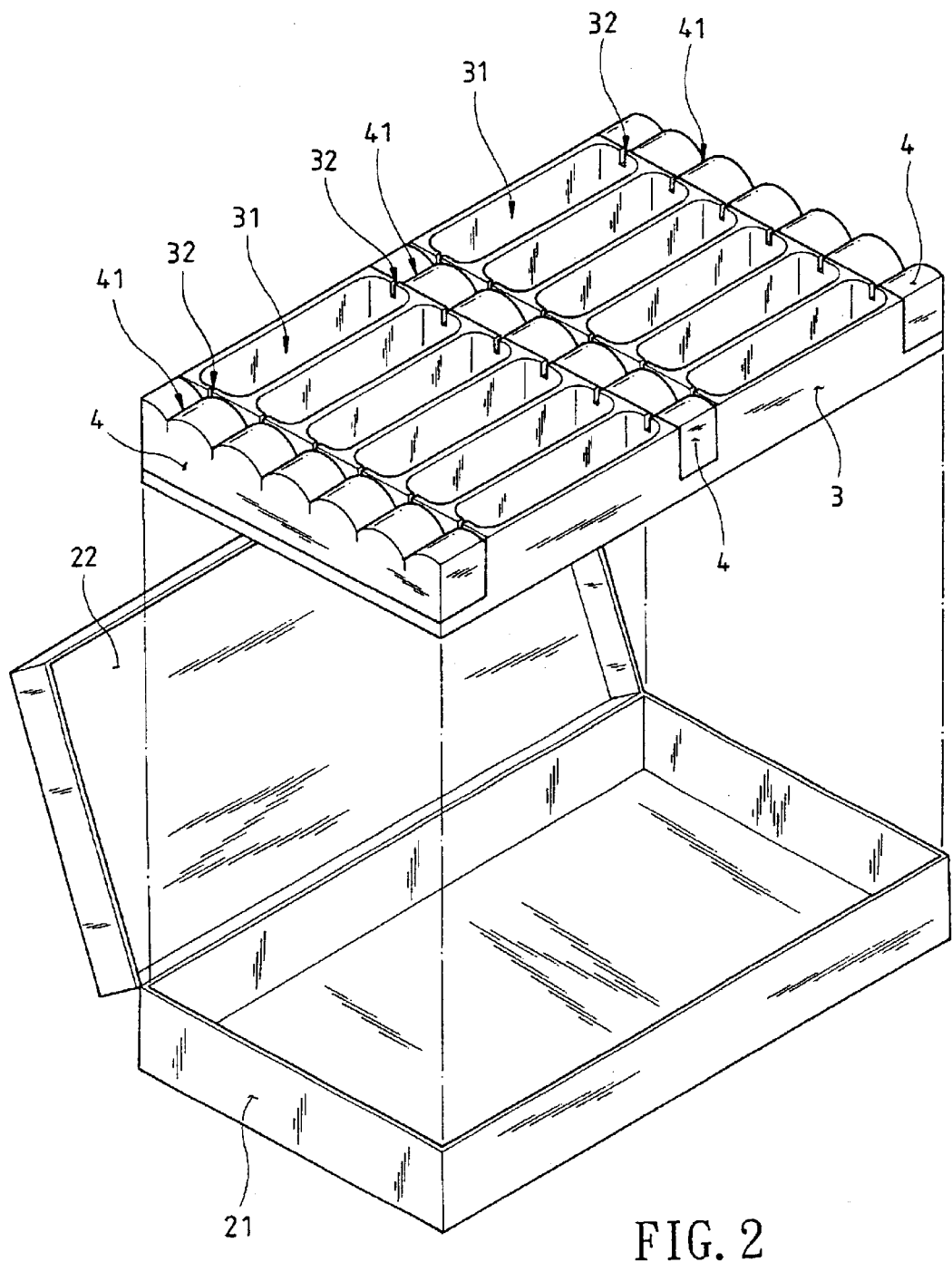
FIG. 2 is an exploded drawing of the conventional product.
Figure 3:
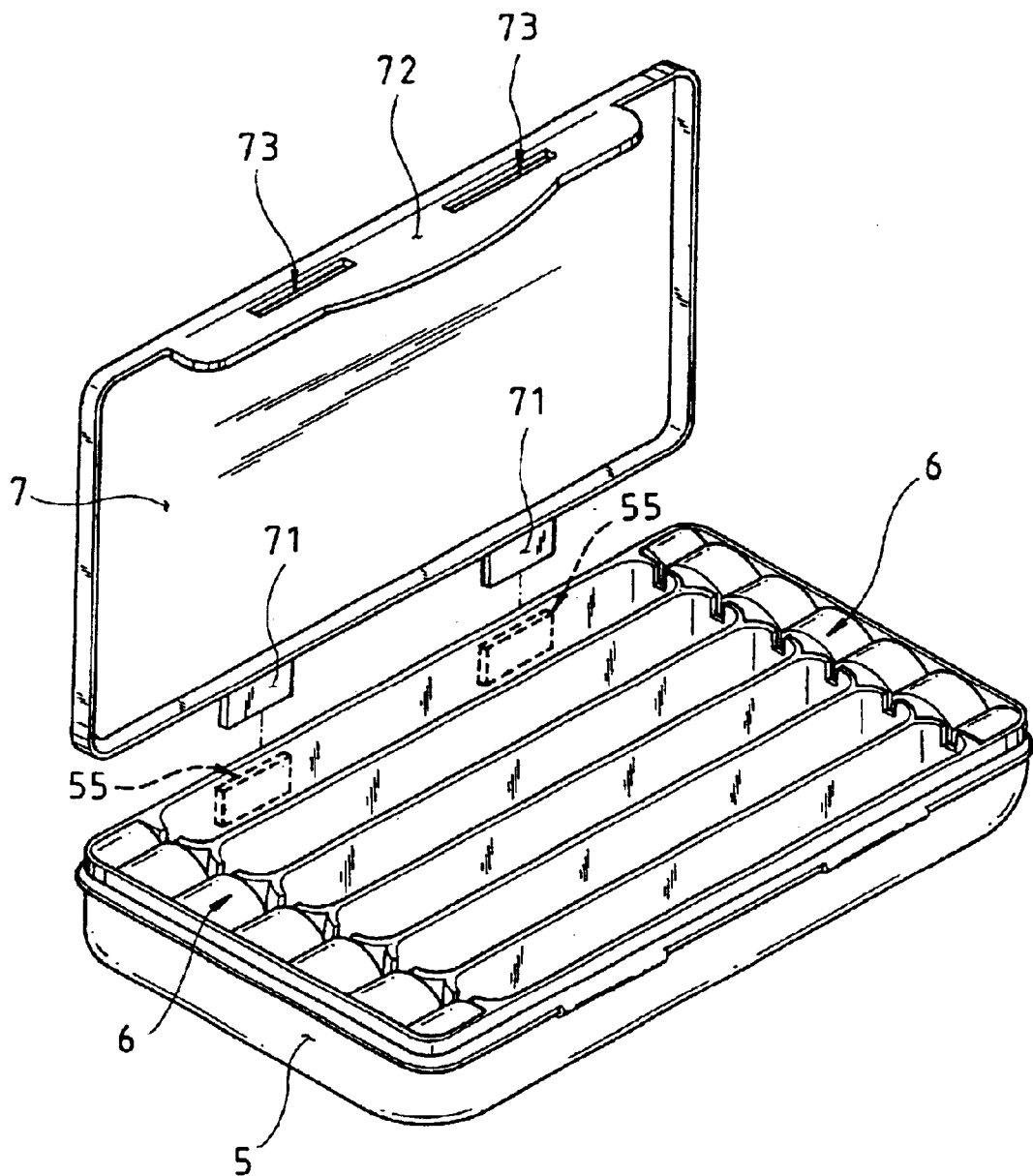
FIG. 3 is an isometric drawing of the invention herein.
Figure 4:
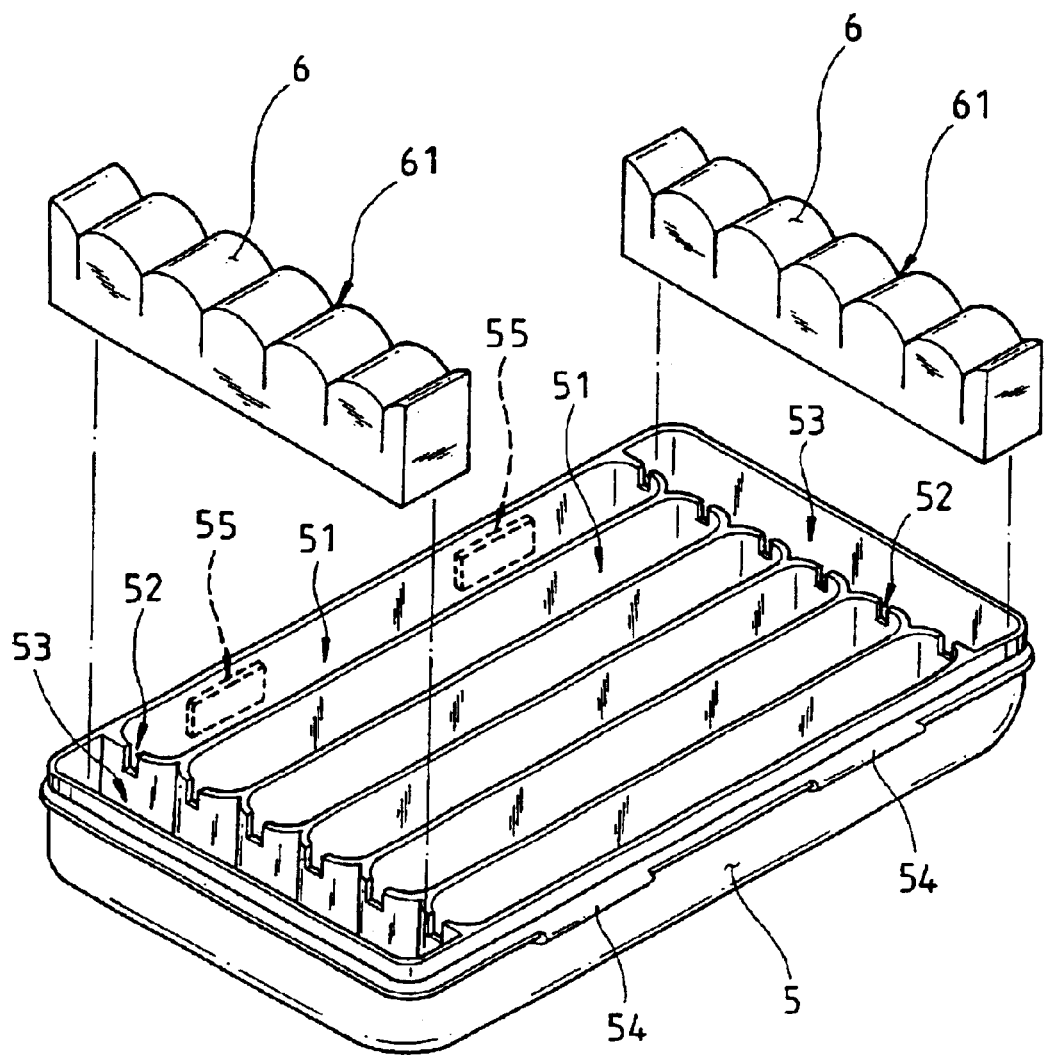
FIG. 4 is an exploded drawing of the invention herein.

Referring to FIG. 3 and FIG. 4, the improved structure fishing lure case of the invention herein is comprised of an enclosure 5, anchoring spacers 6, and a top lid 7, wherein:

The enclosure 5 is a flat rectangular box of one-piece plastic injection-molded construction, with the said enclosure 5 having a plurality of compartments 51 arrayed within and, furthermore, a locating notch 52 formed in the upper aspect at the two extremities of each compartment 51, catch tabs 54 projecting from the top edge along one side of the enclosure 5, and receiving slots 55 disposed in the surface of the opposite side.

Each anchoring spacer 6 is by design an elongate bar having wave-shaped contours across the top extent; a pinch slot 61 is formed along the center of the trough connecting every two wave-shaped peaks and, furthermore, each said pinch slot 61 is aligned with a locating notch 52 formed in the upper aspect at the two extremities of each compartment 51; and each said anchoring spacer 6 is nested in a recess 53 of the enclosure 5.

The top lid 7 is rectangular in shape, with hinge tabs 71 projecting from one side, a hasp 72 extending from the opposite side, and elongate engagement slots 73 formed in the said hasp 72; the hinge tabs 71 of the said top lid 7 are inserted into the receiving slots 55 in one side of the enclosure 5 and the engagement slots 73 are placed over the catch tabs 54 on the opposite side of the enclosure 5, thereby completing the assembly of the improved structure fishing lure case of the present invention.

Figure 5:
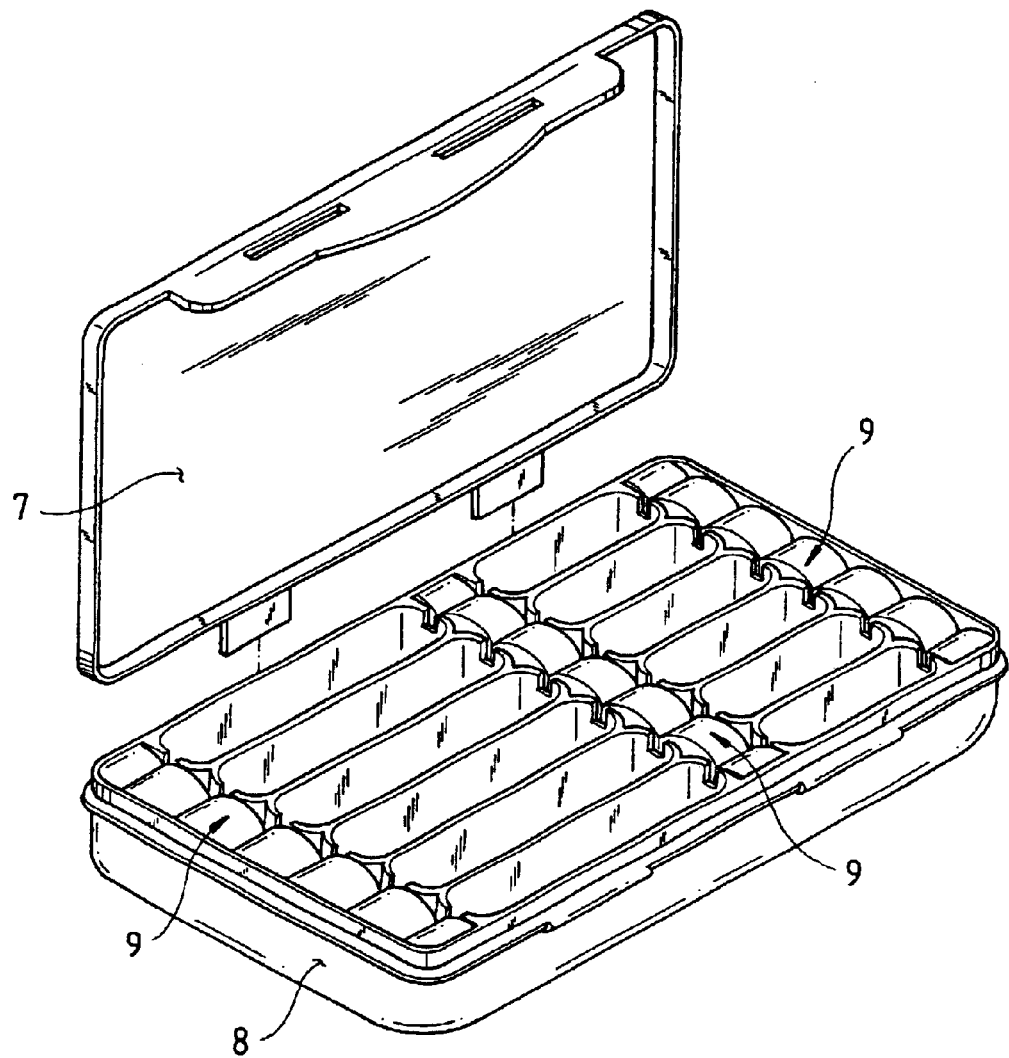
FIG. 5 is an isometric drawing of another embodiment of the invention herein.

Referring to FIG. 5, the drawing of another embodiment of the invention herein, the anchoring spacers 9 are emplaced at the two sides and the center of the enclosure 8 to provide a storage structure for fishing lures of smaller dimensions.

The enclosure 5 of the invention herein features a plurality of arrayed compartments 51; fishing lures are contained in the compartments 51, the fishhook at either the abdominal or posterior portion of double-hook lures or at the distal end of single-hook lures are postured through the locating notch 52 in the upper aspect at the two extremities of each compartment 51 and then secured in the pinch slots 61 of the anchoring spacers 6, thereby neatly organizing the fishing lures and further facilitating fishing lure retrieval.

The said arrangement of the invention herein specifically addresses the approach of the prior art (U.S. Pat. No. 6,427,834), wherein the accommodating box 2 and the supporting frame 3 consist of two individual structural components, and further improves the configuration by reducing it to an enclosure 5 that is functionally equivalent but consists of a single structural component thereby significantly simplifying the manufacturing process, which not only lowers production cost and assembly time, but also greatly lessens the overall structural weight to save shipping costs; as such, the present invention affords users considerably more practical value.

While the said arrangement of the present invention is certainly capable of achieving the claimed objectives and functions, the description of the most preferred embodiments of the invention herein is intended solely for the purpose of disclosing the features of the improved structure fishing lure case invention herein and shall not be construed as a limitation of the spirit and scope of the present invention and, furthermore, all modifications and adaptive substitutions such as varying the quantity of compartments and overall dimensions shall remain protected by the claims of the invention herein.

In summation of the foregoing section, since the improved structure fishing lure case herein is an original invention within its product category that is capable of greater utility and practical value and, furthermore, an identical or similar product has never been observed on the market, the invention herein is submitted to the examination committee for review and the granting of the commensurate patent rights.

What is claimed is:

1. A fishing lure case comprised of an enclosure, a pair of anchoring spacers, and a top lid, wherein:

said enclosure being a flat rectangular box of one-piece plastic injection-molded construction, said enclosure having a plurality of compartments arrayed within and further including a plurality of locating notches, each said locating notch being formed through a respective upper edge of one of said compartments, each said compartment extending longitudinally and having a pair of said locating notches formed through a pair of opposed longitudinally displaced sides, a plurality of catch tabs projecting from a top edge along a first side of said enclosure, a pair of receiving slots being disposed in a surface of a second side of said enclosure laterally opposed to said first side;

each said anchoring spacer being an elongate bar having a wave-shaped contour formed on an upper surface thereof, each said wave-shaped contour including a plurality of wave-shaped peaks a pinch slot being formed through a central region of a trough being positioned between every two wave-shaped peaks, each said pinch slot being aligned with a corresponding one of said locating notches, each said anchoring spacer being removably nested in a recess of said enclosure, said recesses extending laterally within said enclosure and being formed along longitudinally opposed sides of said enclosure; said top lid being rectangular in shape, a pair of hinge tabs projecting from a first side thereof, a hasp extending from a second side of said top lid being laterally opposed to said first side of said top lid, a pair of elongate engagement slots being formed through said hasp, said hinge tabs of said top lid being inserted into said receiving slots of said enclosure and said engagement slots being placed over said catch tabs on the opposite second side of said enclosure, whereby fish hooks of fishing lures received within said compartments may be positioned in corresponding ones of said pinch slots.

* * * * *